United States Patent
Litvin et al.

(10) Patent No.: US 10,084,279 B2
(45) Date of Patent: Sep. 25, 2018

(54) LASER APPARATUS AND METHOD HAVING PLURAL EXCITATION SOURCES WITH ASSOCIATED BEAM SPLITTING ARRANGEMENTS FOR ADAPTIVE CONTROL

(71) Applicant: CSIR, Pretoria (ZA)

(72) Inventors: Ihar Anatolievich Litvin, Pretoria (ZA); Gary Rees King, Pretoria (ZA)

(73) Assignee: CSIR, Pretoria (ZA)

( * ) Notice: Subject to any disclaimer, the term of this patent is extended or adjusted under 35 U.S.C. 154(b) by 0 days.

(21) Appl. No.: 15/827,207

(22) Filed: Nov. 30, 2017

(65) Prior Publication Data

US 2018/0159291 A1 Jun. 7, 2018

(30) Foreign Application Priority Data

Dec. 7, 2016 (GB) .................................. 1620796.1

(51) Int. Cl.
*H01S 3/00* (2006.01)
*H01S 3/094* (2006.01)
(Continued)

(52) U.S. Cl.
CPC ........ *H01S 3/0071* (2013.01); *H01S 3/09408* (2013.01); *H01S 3/09415* (2013.01);
(Continued)

(58) Field of Classification Search
CPC ............. H01S 3/0071; H01S 3/094049; H01S 3/09408; H01S 3/09415; H01S 3/1022;
(Continued)

(56) References Cited

U.S. PATENT DOCUMENTS 4,429,393 A * 1/1984 Giuliano ............... G02F 1/3538
356/459
6,141,143 A 10/2000 Marshall
(Continued)

FOREIGN PATENT DOCUMENTS

CN 104242038 12/2014
DE 4341553 4/1995
(Continued)

OTHER PUBLICATIONS

Extended Search Report for European Patent Application No. 17275191.9, dated May 18, 2018, 5 pages.
(Continued)

*Primary Examiner* — Dung Nguyen
(74) *Attorney, Agent, or Firm* — Sheridan Ross P.C.

(57) ABSTRACT

A laser apparatus has a gain medium which has opposite ends, wherein the laser apparatus includes at least two independently controllable excitation sources, each one of the excitation sources being operable to produce an input beam to excite or pump the gain medium. Beam splitting arrangements are associated with the excitation sources are configured to split the input beam of its associated excitation source into at least two sub-beams. Beam guiding arrangements are associated with the excitation sources and are configured to direct a path of at least one of the split sub-beams from its associated excitation source, whereby each excitation source, its associated beam splitting arrangement, and beam guiding arrangement are arranged such that the sub-beams are respectively directed inwardly towards the gain medium at opposite ends.

15 Claims, 7 Drawing Sheets

(51) Int. Cl.
*H01S 3/102* (2006.01)
*H01S 3/0941* (2006.01)

(52) U.S. Cl.
CPC .. *H01S 3/094049* (2013.01); *H01S 3/094061* (2013.01); *H01S 3/094096* (2013.01); *H01S 3/102* (2013.01); *H01S 3/1022* (2013.01)

(58) Field of Classification Search
CPC ............... H01S 3/094061; H01S 3/102; H01S 3/094096
See application file for complete search history.

(56) References Cited

U.S. PATENT DOCUMENTS

2008/0175296 A1 7/2008 Kumkar
2009/0097507 A1* 4/2009 Zhu ..................... H01S 3/067 372/6
2011/0122896 A1 5/2011 Mao
2016/0252732 A1 9/2016 Cho et al.

FOREIGN PATENT DOCUMENTS

| | | |
|---|---|---|
| GB | 2298082 | 8/1996 |
| GB | 2429833 | 3/2007 |
| GB | 2456053 | 7/2009 |
| JP | H01-214079 | 8/1989 |
| WO | WO 2007/051138 | 5/2007 |

OTHER PUBLICATIONS

Search Report for United Kingdom Patent Application No. GB1620796.1, dated Nov. 9, 2017, 4 pages.

* cited by examiner

LASER APPARATUS AND METHOD HAVING PLURAL EXCITATION SOURCES WITH ASSOCIATED BEAM SPLITTING ARRANGEMENTS FOR ADAPTIVE CONTROL

CROSS-REFERENCE TO RELATED APPLICATIONS

This application claims the benefit of United Kingdom Patent Application No. 1620796.1 filed 7 Dec. 2016, the entire contents of which are incorporated herein by reference.

FIELD OF DISCLOSURE

This disclosure relates generally to lasers and specifically to a laser apparatus capable of electronically and adaptively changing the gain profile (and hence output beam profile).

BACKGROUND OF DISCLOSURE

Lasers beams with a non-Gaussian intensity profile such as super-Gaussian, Airy or doughnut-like can be preferable in some applications, such as laser materials processing, medicine and so on. The Applicant believes that a non-Gaussian laser beam power density distribution may result in a significant reduction of the powder consolidation zone. Additionally, the penetration into the substrate of the working platform using flat-top laser beam profile has better results for single track formation.

Methods of shaping and producing such non-Gaussian beams can be divided into two classes, namely extra- and intra-cavity beam shaping. Extra-cavity (external to the laser cavity) beam shaping is realised by manipulating an output beam from a laser with suitably chosen amplitude and/or phase elements [1]. Unfortunately, extra-cavity beam shaping results in unavoidable losses, while reshaping the beam by phase only elements suffers from sensitivity to environmental perturbations. Additionally, current methods may have serious unsolved problems with reshaping of incoherent laser beams. In order to solve the problem, amplifiers with shaped gain profiles may be used.

The second method of producing such beams is intra-cavity (within the laser cavity) beam shaping. The efficiency of this method can be quite high by means of maximising a laser pump and output mode overlap while producing the required beam [2-3]. A disadvantage of this method is a complexity of the intra cavity optics involved [3]. The Applicant notes that these methods usually do not allow adaptive control of the output beam.

The Applicant wishes to obtain adaptive manipulation of a transverse gain structure to control a transverse intensity distribution of an output beam in laser system. An output beam of such laser may be able to vary both an output power and transverse intensity distribution simultaneously.

SUMMARY OF DISCLOSURE

The disclosure provides a laser apparatus including a gain medium which has opposite ends, wherein the laser apparatus includes:
at least two independently controllable excitation sources, each one of the excitation sources being operable to produce an input beam to excite or pump the gain medium;
a plurality of beam splitting arrangements respectively associated with the excitation sources, each beam splitting arrangement configured to split the input beam of its associated excitation source into at least two sub-beams; and
a plurality of beam guiding arrangements respectively associated with the excitation sources, each one of the beam guiding arrangements being configured to direct a path of at least one of the split sub-beams from its associated excitation source, whereby each excitation source, its associated beam splitting arrangement, and beam guiding arrangement are arranged such that the sub-beams are respectively directed inwardly towards the gain medium at opposite ends.

It will be noted that the gain medium may be excited by at least four sub-beams (two sub-beams from each of the two input beams of the respective two excitation sources). Accordingly, the gain medium may be excited by two inwardly directed sub-beams at each end. At a given end of the gain medium, one sub-beam may be from one of the excitation sources, while the other sub-beam may be from the other excitation source.

The laser apparatus may include an output coupler to produce an output beam from the gain medium. A beam profile of the output beam may be in accordance with a gain profile of the gain medium. The gain profile of the gain medium may be in accordance with a beam profile and/or intensity and/or arrangement of the sub-beams which are directed towards, and excite, the gain medium.

Each excitation source may be aligned with, and directed towards, one or the other of the ends of the medium. Accordingly, one of the sub-beams from the excitation source may not be re-directed, already being aligned with one of the ends of the gain medium. The other of the sub-beams from that excitation source may be guided or folded by the beam guiding arrangement in a loop around the gain medium to the other end, such that the sub-beams from the same excitation source are inwardly directed at opposite ends of the gain medium.

The sub-beams of one of the excitation sources, when directed inwardly to the gain medium, may be aligned or co-axial with each other. The sub-beams of one of the excitation sources, when directed inwardly to the gain medium, may be offset or not co-axial with each other. If the sub-beams of one of the excitation sources are offset, they may be parallel with each other, being laterally spaced a short distance apart.

The sub-beams of different excitation sources, when directed inwardly to the gain medium, may be aligned or co-axial with each other. The sub-beams of different excitation sources, when directed inwardly to the gain medium, may be offset or not co-axial with each other. If the sub-beams of different excitation sources are offset, they may be parallel with each other, being laterally spaced a short distance apart.

In one embodiment, the sub-beams of one of the excitation sources may be co-axial with each other, while the sub-beams of the other excitation source may be offset from each other and also offset from the other sub-beams of the other excitation source, all sub-beams being parallel. Having the sub-beams offset but parallel may permit creation of different beam profiles. Adjusting an intensity of one or both of the excitation sources may permit adjustment of the beam profiles. More specifically, when the sub-beams are offset but parallel or adjacent, adjusting a relative intensity of the excitation sources, and accordingly the intensity of the sub-beams from one of the excitation sources relative to the sub-beams from the other excitation source, may produce variable beam profiles within the gain medium.

The beam splitting arrangement may include a polarising beam splitter. The sub-beams produced from the polarising splitter may respectively be horizontally polarised and vertically polarised. The polarising beam splitter may be a beam splitter cube, as in known in the optical arts (https://en.wikipedia.org/wiki/Beam_splitter, accessed 19 Aug. 2016).

The beam guiding arrangement may include one or more optical mirrors and/or lenses. The beam guiding arrangement may include the beam splitting arrangement. In other words, the beam splitting arrangement may double as a device to split an input beam from one of the excitation sources and also to guide or re-direct at least one of the split sub-beams. The beam guiding arrangement may include a pair of mirrors and the beam splitting arrangement. Each of the pair of mirrors may be obliquely arranged, to change or fold a path of one of the sub-beams by 90°. The beam guiding arrangement may include at least one relay lens.

Each excitation sources may be a diode, e.g., a laser diode. The excitation source may be electronically controllable. Specifically, an input intensity of each excitation source may be electronically controllable. It will be appreciated that adjusting the intensity of the input beam of the excitation source may correspondingly adjust the intensity of the split sub-beams of that excitation source.

The laser apparatus may include a shaping lens arranged between the excitation source and the beam splitting arrangement, the shaping lens configured to shape the input beam from the excitation source.

The gain medium may be a crystalline gain medium. The gain medium may be a Tm:YLF (Thulium-doped Yttrium Lithium Fluoride) crystal slab. The gain medium may be cuboid or cylindrical. The gain medium may be elongate.

The disclosure extends to a laser system including:
the laser apparatus defined above; and
a controller configured to vary relative intensity of the input beams of the excitation sources based on one or more of:
pre-defined profile criteria; or
received user input.

The laser apparatus may include an additional excitation or pump source to maintain a basic gain profile but which is not split.

The disclosure extends to a method of operating a laser apparatus including a gain medium which has opposite ends, wherein the method includes:
providing at least two independent excitation sources, each one of the excitation sources being operable to produce an input beam to excite or pump the gain medium;
splitting, by a plurality of beam splitting arrangements respectively associated with each one of the excitation sources, the input beam of each one of the associated excitation sources into at least two sub-beams; and
directing, by a plurality of beam guiding arrangements respectively associated with each one of the excitation sources, a path of at least one of the split sub-beams from each associated excitation source, whereby each excitation source, its associated beam splitting arrangement, and beam guiding arrangement are arranged such that the sub-beams are respectively directed inwardly towards the gain medium at opposite ends.

The method may include directing at least some of the sub-beams inwardly towards opposite ends of the gain medium at parallel but offset (e.g., not co-axial) spacings. Some sub-beams may be co-axial, with others not being co-axial but merely parallel. The arrangement and spacings of the various sub-beams may influence a gain profile of the gain medium.

The method may include changing the gain profile of the gain medium (and hence a beam profile of an output beam) by adjusting the arrangement and spacings of the various sub-beams and/or by varying an intensity of the input beams relative to each other.

BRIEF DESCRIPTION OF DRAWINGS

The disclosure will now be further described, by way of example, with reference to the accompanying diagrammatic drawings.

In the drawings.

DETAILED DESCRIPTION OF EXAMPLE EMBODIMENT

The following description of the disclosure is provided as an enabling teaching of the disclosure. Those skilled in the relevant art will recognise that many changes can be made to the embodiment described, while still attaining the beneficial results of the present disclosure. It will also be apparent that some of the desired benefits of the present disclosure can be attained by selecting some of the features of the present disclosure without utilising other features. Accordingly, those skilled in the art will recognise that modifications and adaptations to the present disclosure are possible and can even be desirable in certain circumstances, and are a part of the present disclosure. Thus, the following description is provided as illustrative of the principles of the present disclosure and not a limitation thereof.

Figure 1:
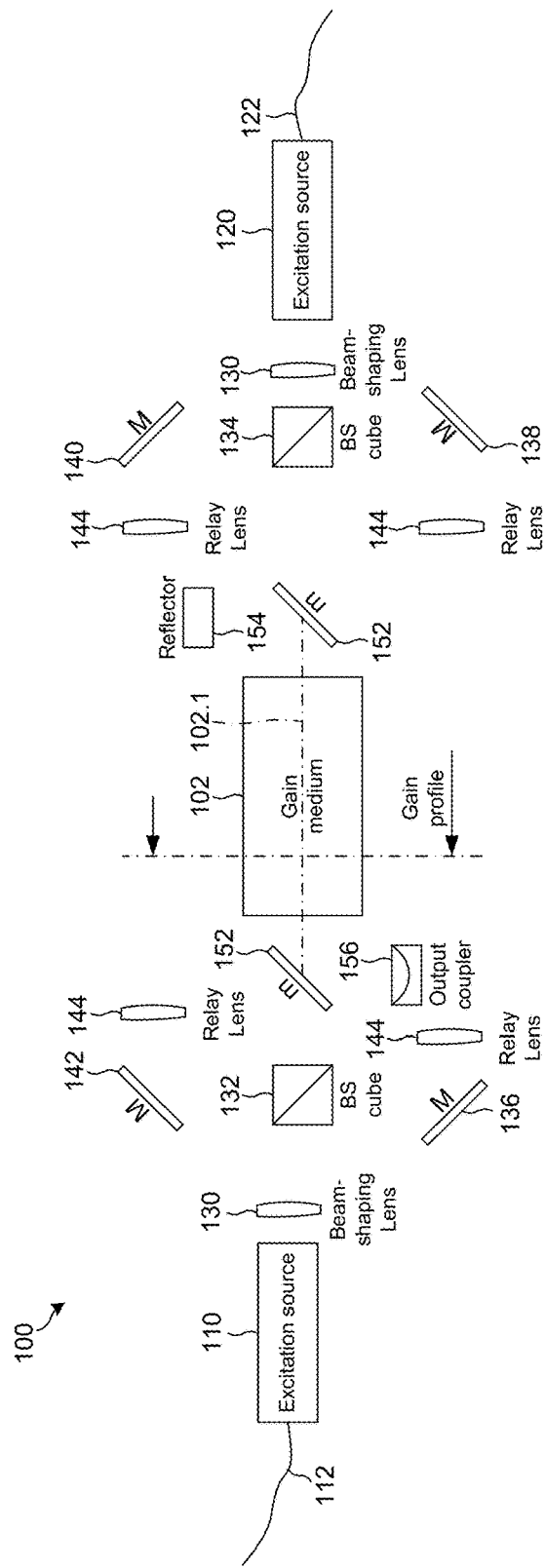
FIG. 1 shows a schematic view of a laser apparatus, in accordance with the disclosure.

FIG. 1 shows a laser apparatus 100 in accordance with the disclosure. FIGS. 2-5 show the same laser apparatus 100 but include schematic pathway beams so may assist more in understanding the operation of the laser apparatus 100.

Referring first mainly to FIG. 1, the laser apparatus 100 has at its heart a gain medium 102 having a longitudinal optical axis 102.1. The gain medium 102 may be a conventional gain medium; in this example, the gain medium is an elongate Tm:YLF (Thulium-doped Yttrium Lithium Fluoride) crystal slab. The laser apparatus 100 could include a housing or enclosure, but for clarity of illustration, such housing is not illustrated.

The laser apparatus 100 has two excitation sources 110, 120 in the form of electronically controllable laser diodes 110, 120. Each laser diode 110, 120 has a fibre coupling 112, 122 to a power source and controller (not illustrated) which is operable to control and vary an intensity of input beams 210, 220 produced by the laser diodes 110, 120. More specifically, each laser diode 110, 120 is an Apollo diode emits a randomly polarised laser beam at a wavelength of 793 nm. The laser diode 110 has a maximum power output of 150 W with an $HG_{01}$ beam profile. The other laser diode 120 has a maximum power output of 65 W with a Gaussian beam profile.

Figure 2:
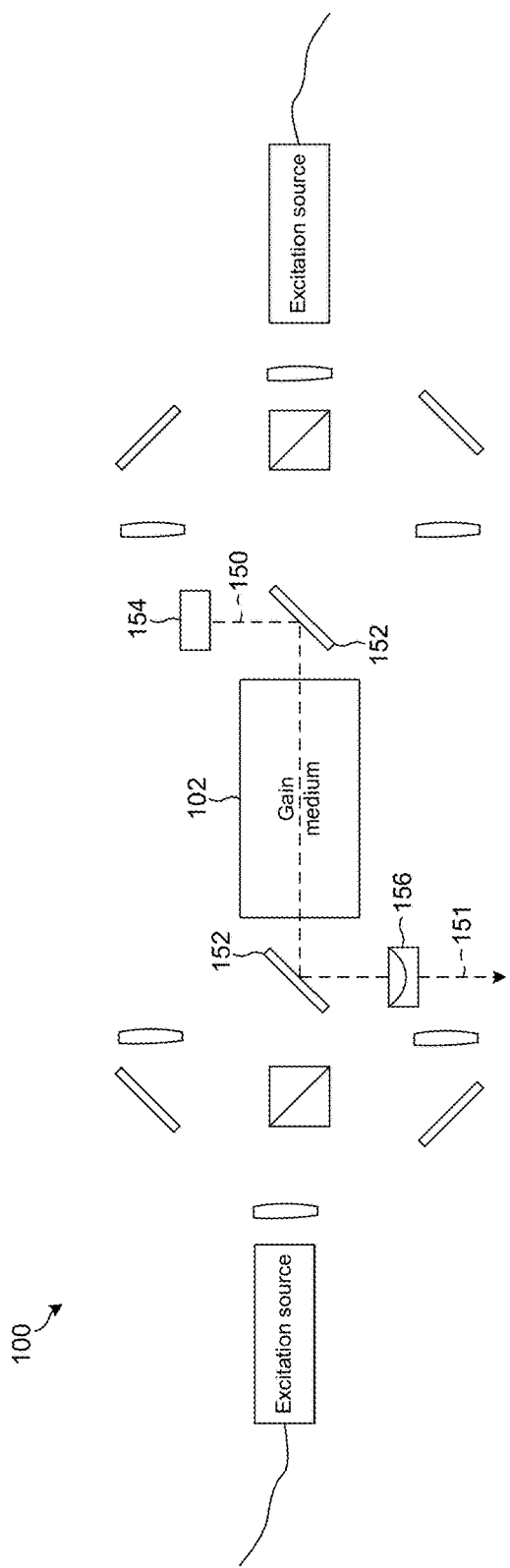
FIG. 2 shows a schematic view of the laser apparatus of FIG. 1 indicating a resonator optical pathway.

FIG. 2 illustrates a laser resonator optical path 151 which is defined between two optical elements: i) a mirror 154 with high reflecting characteristics at 2 µm wavelength and anti-reflection coating for the 793 nm for the input beams on one side, and ii) an 80% partially reflecting output coupler 156 with a 300 mm radius of curvature. The resonator optical path 151 is folded into a double-legged shape using two 45° folding mirrors 152 which have a high reflection coating for 2 µm (the output wavelength) and high transmission for 793 nm (the input wavelength). These mirrors 152 would still allow the input pump lasers to enter the resonator 151 and excite the gain medium 102 from either side. An output beam 151 may be obtained from the output coupler 156.

Figure 3:
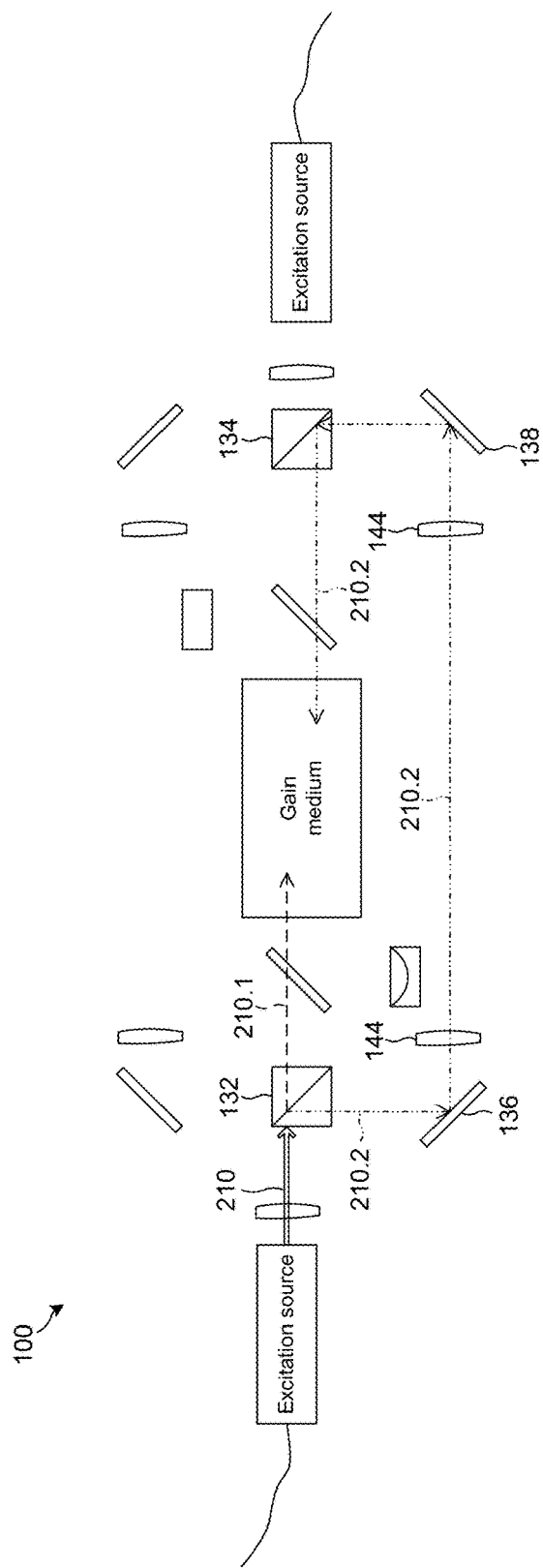
FIG. 3 shows a schematic view of the laser apparatus of FIG. 1 indicating one input pathway.
Figure 4:
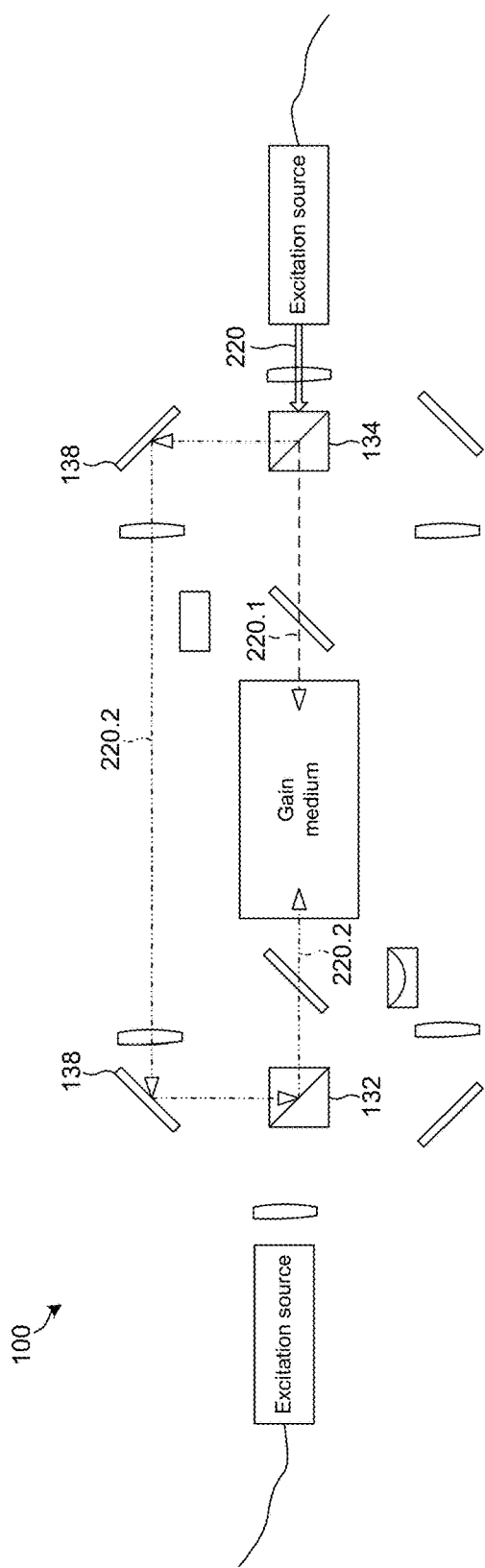
FIG. 4 shows a schematic view of the laser apparatus of FIG. 1 indicating another input pathway.

Referring to FIGS. 3-4, each laser diode 110, 120 has a beam splitting arrangement 132, 134 associated therewith. In this example, the beam splitting arrangement 132, 134 is a polarising beam splitter (BS) cube 132, 134. The BS cube 132, 134 splits an input beam into two sub-beams, namely a vertically polarised sub-beam and a horizontally polarised sub-beam. Specifically (and referring to FIGS. 3-5), the input beams 210, 220 are split into sub-beams 210.1, 210.2, 220.1, 220.2.

Figure 5:
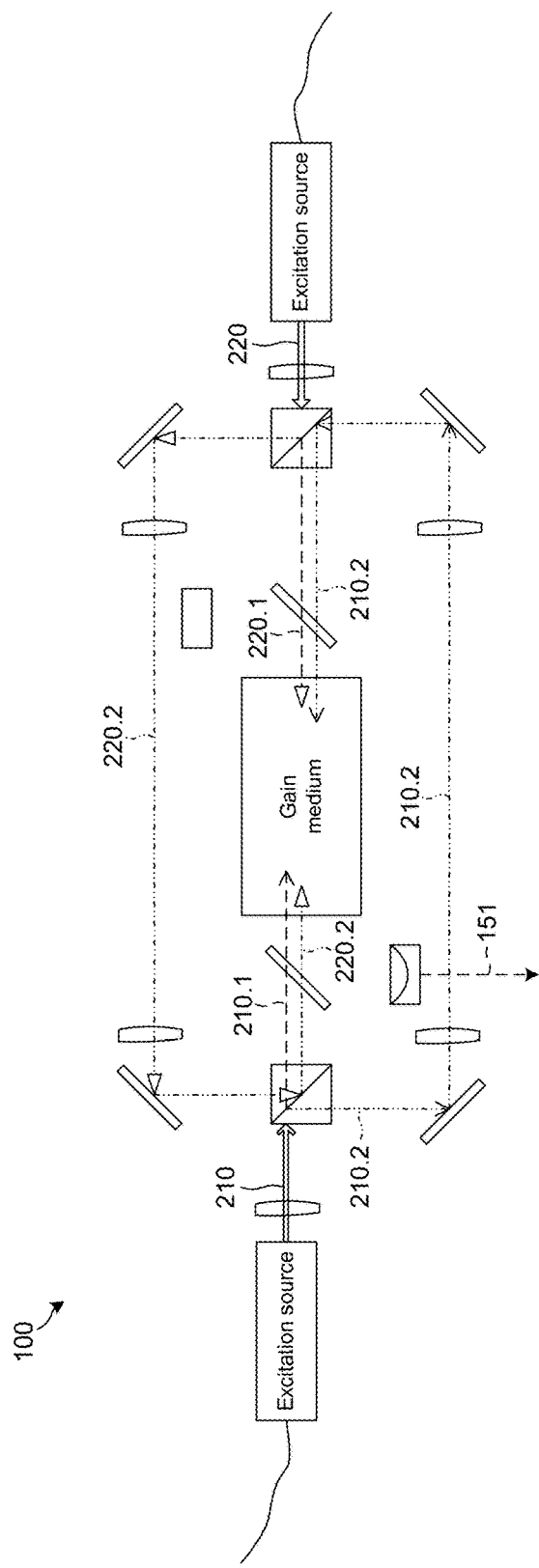
FIG. 5 shows a schematic view of the laser apparatus of FIG. 1 indicating both input pathways.

For clarity of illustration, one of the input beams 210 and associated sub-beams 210.1, 210.2 have open arrowheads and are illustrated in isolation in FIG. 3. The other input beam 220 and associated sub-beams 220.1, 220.2 have closed arrowheads and are illustrated in isolation in FIG. 4. Horizontally polarised beams 210.1, 220.1 are indicated by dashed lines, while vertically polarised sub-beams 210.2, 220.0 are indicated by dashed and dotted lines. FIGS. 3-4 do not necessarily represent the laser apparatus 100 in use because it is unlikely that the laser diodes 110, 120 will be operated one without the other. FIGS. 3-4 are merely for clarity of illustration. FIG. 5 represents actual usage of the laser apparatus 100 because both laser diodes 110, 120 are operational.

Each laser diode 110, 120 has a beam guiding arrangement 132, 134, 136, 138, 140, 142 (132-142 for brevity) associated therewith. One of the beam guiding arrangements 132, 134, 136, 138 (associated with the first laser diode 110) comprises a pair of oblique mirrors (M) 136, 138 which are orientated at 45° relative to the optical axis 102.1 and at 90° relative to each other. The other beam guiding arrangement 132, 134, 140, 142 (associated with the second laser diode 120) similarly comprises two mirrors 140, 142. The mirrors 138, 138; 140, 142 fold their respective beams by 90° for a total of 180°. In addition, a portion of each BS cube 132, 134 forms part of each of the beam guiding arrangements 132-142. Accordingly, each beam guiding arrangement 132-142 defines a path with four oblique structures each reflecting light by 90°.

The laser apparatus 100 also has a pair of beam shaping converging mirrors 130 provided in a path of the input beams 210, 220 between the respective excitation sources 110, 120 and the BS cubes 132, 134. Also, a pair of relay lenses 144 is provided in a path of each beam splitting arrangement 132-142.

In this example, all the sub-beams 210.1, 210.2, 220.1, 220.2 are parallel with one another and parallel with the optical axis 102.1 (refer to FIG. 5). However, not all sub-beams 210.1, 210.2, 220.1, 220.2 are co-axial. While the Applicant envisages that there are various configurations which could be practicable (e.g., all sub-beams 210.1, 210.2, 220.1, 220.2 co-axial or no sub-beams 210.1, 210.2, 220.1, 220.2 co-axial), in this example, the sub-beams 210.1, 210.2, 220.1, 220.2 have a specific and defined configuration.

The two sub-beams 220.1, 220.2 from one of the laser diodes 120 are parallel and co-axial with each other and with the optical axis 102.1. More specifically, both sub-beams 220.1, 220.2, because they are co-axial, reinforce each other and provide a higher gain profile based on their intensity. In contrast with this, the sub-beams 210.1, 210.2 from the other laser diode 110 are not co-axial (although they are parallel). More specifically, the sub-beams 210.1, 210.2 are laterally spaced from the optical axis 102.1, with one sub-beam 210.1 arranged above the optical axis 102.1 and the other sub-beam 210.2 arranged below. The spacing between the respective sub-beams 210.1, 210.2, 220.1, 220.2 may be manipulated or finely adjusted to realise a desired overlap or gain area for a particular laser cavity.

All of the sub-beams 210.1, 210.2, 220.1, 220.2 are arranged in a plane (an upright plane parallel with the optical axis, 102.1 in this example), having a 1-2-1 arrangement (when viewed in a vertical direction). The specific arrangement of the sub-beams 210.1, 210.2, 220.1, 220.2—which effectively function as the excitation or pump source for the gain medium 102—were chosen in agreement with the required output beam profile (see below). The positions of the sub-beams 210.1, 210.2, 220.1, 220.2 were chosen to provide a gain profile and output beam profile of $LG_{01}$, Flat Top, and $LG_{00}$, depending on relative intensities.

It will be appreciated that varying the intensity of the laser diodes 110, 120 will vary the intensity of the associated sub-beams 210.1, 210.2, 220.1, 220.2. The layout and intensity of the sub-beams 210.1, 210.2, 220.1, 220.2 will dictate the gain profile provided by the gain medium 102. In this example, the layout is pre-configured and is not changeable on the fly (although the addition of displacement means, e.g., small servo motors, could change this). Importantly, varying the relative intensity of the laser diodes 110, 120 changes the shape of the gain profile.

Notably, the intensity of the laser diodes 110, 120 is electronically—and very rapidly—variable. The intensity of the input beams 210, 220 supplied by the respective laser diodes 110, 120 is dictated by an input current provided by the controller with is controlled using software and solid-state electronics and can therefore be varied rapidly, in the order of MHz. This is much quicker than mechanical variations could be realised in this example. Accordingly, the gain profile of the gain medium 102 can be changed electronically and rapidly.

Figure 6:
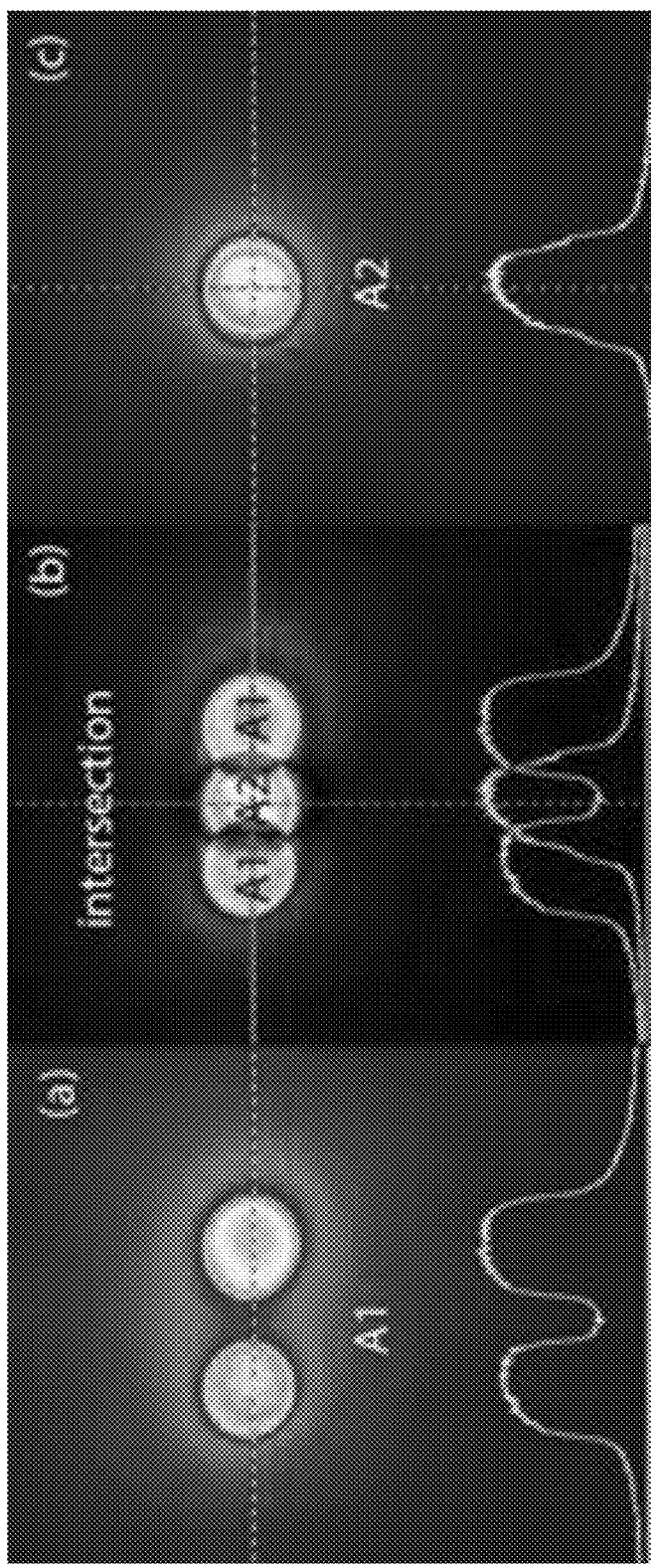
FIG. 6 shows a schematic intensity graph of input beams of the laser apparatus of FIG. 1.
Figure 7:
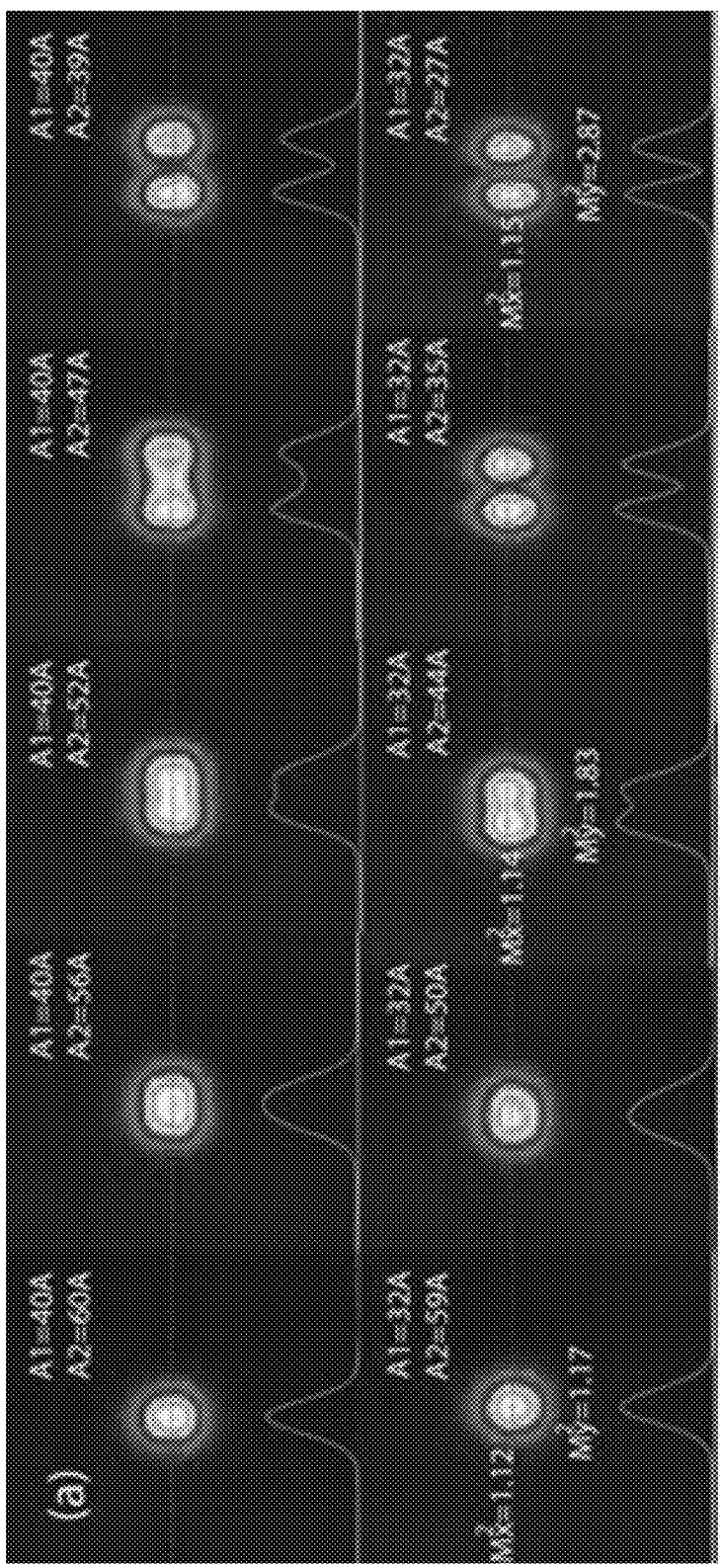
FIG. 7 shows a schematic intensity graph of various output beams of the laser apparatus of FIG. 1.

Referring now to FIGS. 6-9, various gain profiles or intensity profiles produced by the laser apparatus 100 are illustrated. An early prototype was constructed to produce the output readings. The intensity images of FIGS. 6-7 were captured by a Pyrocam™ camera which is a type of pyroelectric solid-state detector or camera. In FIGS. 6-8, A1 refers to the input beam 210 from the first (higher power) laser diode 110, while A2 refers to the input beam 220 generated by the second (lower power) laser diode 120.

In FIG. 6, a left frame (a) indicates the input beam from the laser diode 110 (A1) while a right frame (c) indicates an input beam from the other laser diode 120 (A2). The middle frame (b) illustrates the overlap or intersection of the input beams 210, 220 and accordingly a profile on the output beam 150.

FIG. 7 shows various output intensity profiles of the output beam 150 given different relative combinations of input power supplied to the laser diodes 110, 120 (A1, A2). It will be noted that various shapes, ranging from Gaussian (or pseudo-Gaussian), to flat-top, to double Gaussian may be achieved. Ultimately, the Applicant believes that using the design of the laser apparatus 100, with various efficiency tweaks, a higher-efficiency and high-power (>10 W) output beam 150 could be realised.

The Applicant believes that the disclosure as illustrated has significant advantages in that it permits rapid varying of gain profile (and hence output beam profile) of a high-power laser beam. Control is conveniently electronic and can be a quick as the current of the excitation sources can be varied. Power can be as high as the intensity of the excitation sources (laser diodes) allows. The gain profile can be pre-configured by varying the offset and spacing between the various split sub-beams. By varying a beam profile rapidly, a time-averaged "effective" new beam profile can be created.

REFERENCES

1. Laser Beam Shaping, Theory and Techniques, ed Dickey/Holswade (New York: Marcel Dekker, Inc., 2000).
2. I. A. Litvin, "Implementation of intra-cavity beam shaping technique to enhance pump efficiency," Journal of Modern Optics 59, 241-244 (2012).
3. I. A. Litvin and A. Forbes, "Gaussian mode selection with intra-cavity diffractive optics," Opt. Lett. 34, 2991-2993 (2009).

What is claimed is:

1. A laser apparatus including a gain medium which has opposite ends, wherein the laser apparatus includes:
   at least two independently controllable excitation sources, each one of the excitation sources being operable to produce an input beam to excite or pump the gain medium;
   a plurality of beam splitting arrangements respectively associated with the excitation sources, each beam splitting arrangement configured to split the input beam of its associated excitation source into at least two sub-beams; and
   a plurality of beam guiding arrangements respectively associated with the excitation sources, each one of the beam guiding arrangements being configured to direct a path of at least one of the split sub-beams from its associated excitation source, whereby each excitation source, its associated beam splitting arrangement, and beam guiding arrangement are arranged such that the sub-beams are respectively directed inwardly towards the gain medium at opposite ends.

2. The laser apparatus as claimed in claim 1, in which the gain medium is excited by two inwardly directed sub-beams at each end, wherein, at each end, one sub-beam is from one of the excitation sources, while the other sub-beam is from the other excitation source.

3. The laser apparatus as claimed in claim 1, in which:
   a beam profile of an output beam of the laser apparatus is in accordance with a gain profile of the gain medium; and
   the gain profile of the gain medium is in accordance with a beam profile and/or intensity and/or arrangement of the sub-beams which are directed towards, and excite, the gain medium.

4. The laser apparatus as claimed in claim 1, in which:
   each excitation source is aligned with, and directed towards, one or the other of the ends of the gain medium; and optionally
   one of the sub-beams from the excitation is not re-directed, already being aligned with one of the ends of the gain medium, while the other of the sub-beams from that excitation source is guided by the beam guiding arrangement in a loop around the gain medium to the other end, such that the sub-beams from the same excitation source are inwardly directed at opposite ends of the gain medium.

5. The laser apparatus as claimed in claim 1, in which:
   the sub-beams of one of the excitation sources, when directed inwardly to the gain medium, are parallel and co-axial with each other; or
   the sub-beams of one of the excitation sources, when directed inwardly to the gain medium, are parallel but not co-axial with each other.

6. The laser apparatus as claimed in claim 1, in which:
   the sub-beams of different excitation sources, when directed inwardly to the gain medium are parallel with each other; and optionally
   the sub-beams of one of the excitation sources are co-axial with each other, while the sub-beams of the other excitation source are offset from each other and also offset from the other sub-beams of the other excitation source, all sub-beams being parallel.

7. The laser apparatus as claimed in claim 1, in which the beam splitting arrangement includes a polarising beam splitter.

8. The laser apparatus as claimed in claim 1, in which each excitation source is a laser diode.

9. The laser apparatus as claimed in claim 1, in which each beam guiding arrangement includes at least two mirrors to fold the sub-beams around the gain medium.

10. The laser apparatus as claimed in claim 1, which includes a shaping lens arranged between the excitation source and the beam splitting arrangement, the shaping lens configured to shape the input beam from the excitation source.

11. The laser apparatus as claimed in claim 1, in which the gain medium is a crystalline gain medium, optionally being a Tm:YLF (Thulium-doped Yttrium Lithium Fluoride) crystal slab.

12. A laser system including:
    the laser apparatus as claimed in claim 1; and
    a controller configured to vary relative intensities of the input beams of the excitation sources based on one or more of:
    pre-defined profile criteria; or
    received user input.

13. A method of operating a laser apparatus including a gain medium which has opposite ends, wherein the method includes:
    providing at least two independent excitation sources, each one of the excitation sources being operable to produce an input beam to excite or pump the gain medium;
    splitting, by a plurality of beam splitting arrangements respectively associated with each one of the excitation sources, the input beam of each one of the associated excitation sources into at least two sub-beams; and
    directing, by a plurality of beam guiding arrangements respectively associated with each one of the excitation sources, a path of at least one of the split sub-beams from each associated excitation source, whereby each excitation source, its associated beam splitting arrangement, and beam guiding arrangement are arranged such that the sub-beams are respectively directed inwardly towards the gain medium at opposite ends.

14. The method as claimed in claim 13, which includes directing at least some of the sub-beams inwardly towards opposite ends of the gain medium such that at least some of the sub-beams are parallel but not co-axial with each other.

15. The method as claimed in claim 13, which includes changing the gain profile of the gain medium (and hence a beam profile of an output beam) by one or more of:

adjusting the arrangement or spacings of the various sub-beams; and/or by varying an intensity of the input beams absolutely or relative to each other.

\* \* \* \* \*